(12) United States Patent
Kawamitsu et al.

(10) Patent No.: US 12,319,763 B2
(45) Date of Patent: Jun. 3, 2025

(54) FLUORINE-CONTAINING COPOLYMER, OPTICAL RESIN COMPOSITION, AND OPTICAL RESIN FORMED BODY

(71) Applicant: NITTO DENKO CORPORATION, Ibaraki (JP)

(72) Inventors: Shoichi Kawamitsu, Osaka (JP); Naoya Sugimoto, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 676 days.

(21) Appl. No.: 17/630,577

(22) PCT Filed: Jul. 31, 2020

(86) PCT No.: PCT/JP2020/029454
§ 371 (c)(1),
(2) Date: Jan. 27, 2022

(87) PCT Pub. No.: WO2021/020566
PCT Pub. Date: Feb. 4, 2021

(65) Prior Publication Data
US 2022/0267490 A1 Aug. 25, 2022

(30) Foreign Application Priority Data
Jul. 31, 2019 (JP) .................. 2019-141642

(51) Int. Cl.
C08F 214/18 (2006.01)
C08F 214/00 (2006.01)
G02B 6/02 (2006.01)

(52) U.S. Cl.
CPC ...... *C08F 214/182* (2013.01); *C08F 214/184* (2013.01); *G02B 6/02033* (2013.01)

(58) Field of Classification Search
CPC .................. C08F 214/182; C08F 214/184
See application file for complete search history.

(56) References Cited

U.S. PATENT DOCUMENTS 3,308,107 A * 3/1967 Selman .................. C08F 24/00
526/236
4,565,855 A * 1/1986 Anderson ............ C07D 317/32
524/544
(Continued)

FOREIGN PATENT DOCUMENTS

EP 2821846 A1 * 1/2015 .............. C08F 14/18
EP 2821847 A1 * 1/2015 .............. C08L 27/12
(Continued)

OTHER PUBLICATIONS

Fang, M.; Chiang, H.-C .; Okamoto, Y. J. Fluorine Chem. 2018, 214, 63-67. (Year: 2018).*

(Continued)

*Primary Examiner* — Rip A Lee
(74) *Attorney, Agent, or Firm* — WHDA, LLP

(57) ABSTRACT

The fluorine-containing copolymer of the present invention includes:
a structural unit (A) represented by the following formula (1); and
at least one selected from the group consisting of a structural unit (B) represented by the following formula (2), a structural unit (C) represented by the following formula (3), and a structural unit (D) represented by the following formula (4):

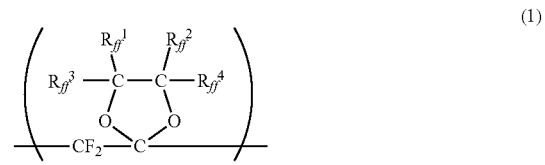

(1)

in the formula (1), $R_{ff}^1$ to $R_{ff}^4$ each independently represent a fluorine atom, a perfluoroalkyl group having 1 to 7 carbon atoms, or a perfluoroalkyl ether group having 1 to 7 carbon atoms, and $R_{ff}^1$ and $R_{ff}^2$ are optionally linked to form a ring;

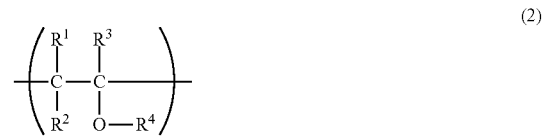

(2)

in the formula (2), $R^1$ to $R^3$ each independently represent a fluorine atom or a perfluoroalkyl group having 1 to 7 carbon atoms, $R^4$ represents a perfluoroalkyl group having 1 to 7 carbon atoms, the perfluoroalkyl group optionally has a ring structure, one or some of the fluorine atoms are optionally substituted by a halogen atom other than a fluorine atom, and one or some of fluorine atoms in the perfluoroalkyl group are optionally substituted by a halogen atom other than a fluorine atom;

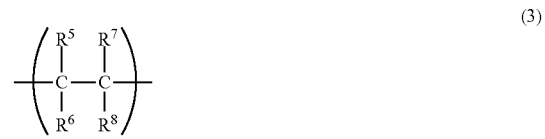

(3)

in the formula (3), $R^5$ to $R^8$ each independently represent a fluorine atom or a perfluoroalkyl group having 1 to 7 carbon atoms, the perfluoroalkyl group optionally (Continued)

has a ring structure, one or some of the fluorine atoms are optionally substituted by a halogen atom other than a fluorine atom, and one or some of fluorine atoms in the perfluoroalkyl group are optionally substituted by a halogen atom other than a fluorine atom; and

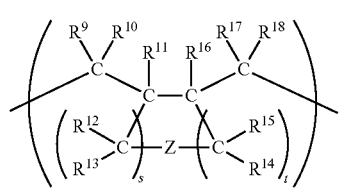

(4)

in the formula (4), Z represents an oxygen atom, a single bond, or —OC($R^{19}R^{20}$)O—, $R^9$ to $R^{20}$ each independently represent a fluorine atom, a perfluoroalkyl group having 1 to 5 carbon atoms, or a perfluoroalkoxy group having 1 to 5 carbon atoms, one or some of the fluorine atoms are optionally substituted by a halogen atom other than a fluorine atom, one or some of fluorine atoms in the perfluoroalkyl group are optionally substituted by a halogen atom other than a fluorine atom, one or some of fluorine atoms in the perfluoroalkoxy group are optionally substituted by a halogen atom other than a fluorine atom, s and t are each independently 0 to 5, and s+t represents an integer of 1 to 6 (when Z is —OC($R^{19}R^{20}$)O—, s+t is optionally 0).

12 Claims, No Drawings

(56) References Cited

U.S. PATENT DOCUMENTS

| | | | | |
|---|---|---|---|---|
| 5,408,020 | A * | 4/1995 | Hung | C08F 234/02 526/254 |
| 6,824,930 | B1 * | 11/2004 | Wheland | G03F 7/091 430/5 |
| 8,828,121 | B1 * | 9/2014 | He | B01D 53/228 95/55 |
| 9,636,632 | B2 * | 5/2017 | Merkel | B01D 71/32 |
| 9,975,084 | B2 * | 5/2018 | Merkel | B01D 53/228 |
| 11,905,350 | B2 * | 2/2024 | Lousenberg | H01M 8/1039 |
| 2002/0009276 | A1 * | 1/2002 | Sugiyama | G02B 1/046 385/124 |
| 2003/0021577 | A1 | 1/2003 | Sugiyama et al. | |
| 2009/0126733 | A1 * | 5/2009 | Kulkarni | B01D 71/32 128/203.14 |
| 2009/0292093 | A1 * | 11/2009 | Matsuura | C07D 317/42 549/453 |
| 2012/0156504 | A1 * | 6/2012 | Takebe | G03F 7/7095 524/544 |
| 2015/0136723 | A1 * | 5/2015 | Bamba | B65D 1/0215 215/12.2 |

FOREIGN PATENT DOCUMENTS

| | | |
|---|---|---|
| JP | S43-29154 B1 | 12/1968 |
| JP | H09-512854 A | 12/1997 |
| JP | 2002-71972 A | 3/2002 |
| JP | 2003-98365 A | 4/2003 |
| JP | 2005-321685 A | 11/2005 |
| JP | 2006-89624 A | 4/2006 |
| JP | 2006-126861 A | 5/2006 |
| JP | 2019-49658 A | 3/2019 |
| WO | 95-30699 A1 | 11/1995 |
| WO | 2011/027782 A1 | 3/2011 |

OTHER PUBLICATIONS

Fang, M. et al.; Mechanical and optical properties of the copolymers of perfluoro(2-methylene-4-methyl-1,3-dioxolane) and chlorotrifluoroethylene, Journal of Fluorine Chemistry, vol. 214, 2018, pp. 63-67. (5 pages) cited in Written Opinion dated Dec. 27, 2024.

Written Opposition dated Dec. 27, 2023, issued in counterpart JP patent No. 7299788, with English Translation. (41 pages).

Fang, M. et al.; Mechanical and optical properties of the copolymers of perfluoro(2-methylene-4-methyl-1,3-dioxolane) and chlorotrifluoroethylene, Journal of Fluorine Chemistry, vol. 214, 2018, pp. 63-67. (5 pages) cited in Written Opposition dated Dec. 27, 2023.

International Search Report dated Oct. 13, 2020, issued in counterpart International Application No. PCT/JP2020/029454, w/English translation (6 pages).

Written Opinion dated Oct. 13, 2020, issued in counterpart International Application No. PCT/JP2020/029454, w/ English translation (8 pages).

* cited by examiner

FLUORINE-CONTAINING COPOLYMER, OPTICAL RESIN COMPOSITION, AND OPTICAL RESIN FORMED BODY

TECHNICAL FIELD

The present invention relates to a fluorine-containing copolymer, an optical resin composition including the fluorine-containing copolymer, and an optical resin formed body including the fluorine-containing copolymer.

BACKGROUND ART

A fluorine-containing polymer is a useful substance used as the material of optical members such as plastic optical fibers (hereinafter referred to as "POFs") and exposure members in a wide range of fields.

For example, Patent Literature 1 describes, as a non-crystalline fluorine-containing polymer having substantially no C—H bond and suitably used as the material of POFs, a fluorine-containing polymer having a fluorine-containing aliphatic ring structure in its main chain. Such a fluorine-containing polymer can be obtained, for example, by polymerization of a monomer having a fluorine-containing aliphatic ring structure.

CITATION LIST

Patent Literature

Patent Literature 1: JP 2003-098365 A

SUMMARY OF INVENTION

Technical Problem

In recent years, high thermal resistance is often required of optical members. Therefore, it is desirable that a fluorine-containing polymer to be used as the material of optical members have high thermal resistance.

Regarding the above fluorine-containing polymer having a fluorine-containing aliphatic ring structure in its main chain, a fluorine-containing polymer obtained by polymerization of a monomer having a perfluoro(1,3-dioxolane) structure represented by the following formula (X) can have high thermal resistance.

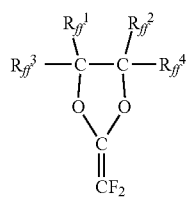
(X)

In the formula (X), $R_{ff}^1$ to $R_{ff}^4$ each independently represent a fluorine atom, a perfluoroalkyl group having 1 to 7 carbon atoms, or a perfluoroalkyl ether group having 1 to 7 carbon atoms. $R_{ff}^1$ and $R_{ff}^2$ are optionally linked to form a ring.

However, according to the results of investigation by the present inventors, although having a high glass transition temperature and high thermal resistance, the fluorine-containing polymer obtained by polymerization of the monomer having the perfluoro(1,3-dioxolane) structure represented by the above formula (X) needs to be improved in terms of its high likelihood of thermal decomposition.

Therefore, the present invention aims to provide a fluorine-containing polymer less likely to be thermally decomposed and having high thermal resistance by improving a fluorine-containing polymer obtained by polymerization of the monomer having the perfluoro(1,3-dioxolane) structure represented by the above formula (X) in terms of its high likelihood of thermal decomposition without greatly decreasing the thermal resistance thereof. Moreover, the present invention aims to provide an optical resin composition and optical resin formed body including the fluorine-containing polymer, being less likely to be thermally decomposed, and having high thermal resistance.

Solution to Problem

A fluorine-containing copolymer according to a first aspect of the present invention includes:
a structural unit (A) represented by the following formula (1); and
at least one selected from the group consisting of a structural unit (B) represented by the following formula (2), a structural unit (C) represented by the following formula (3), and a structural unit (D) represented by the following formula (4):

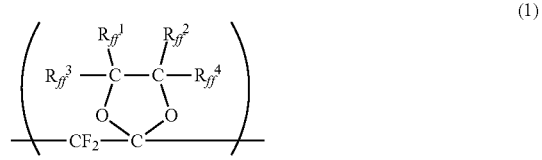
(1)

in the formula (1), $R_{ff}^1$ to $R_{ff}^4$ each independently represent a fluorine atom, a perfluoroalkyl group having 1 to 7 carbon atoms, or a perfluoroalkyl ether group having 1 to 7 carbon atoms, and $R_{ff}^1$ and $R_{ff}^2$ are optionally linked to form a ring;

(2)

in the formula (2), $R^1$ to $R^3$ each independently represent a fluorine atom or a perfluoroalkyl group having 1 to 7 carbon atoms, $R^4$ represents a perfluoroalkyl group having 1 to 7 carbon atoms, the perfluoroalkyl group optionally has a ring structure, one or some of the fluorine atoms are optionally substituted by a halogen atom other than a fluorine atom, and one or some of fluorine atoms in the perfluoroalkyl group are optionally substituted by a halogen atom other than a fluorine atom;

(3)

The fluorine-containing copolymer of the present embodiment includes:

a structural unit (A) represented by the following formula (1); and at least one selected from the group consisting of a structural unit (B) represented by the following formula (2), a structural unit (C) represented by the following formula (3), and a structural unit (D) represented by the following formula (4):

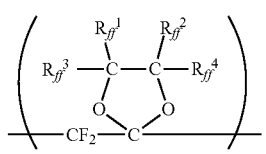

(1)

in the formula (1), $R_{\mathit{ff}}^1$ to $R_{\mathit{ff}}^4$ each independently represent a fluorine atom, a perfluoroalkyl group having 1 to 7 carbon atoms, or a perfluoroalkyl ether group having 1 to 7 carbon atoms, and $R_{\mathit{ff}}^1$ and $R_{\mathit{ff}}^2$ are optionally linked to form a ring;

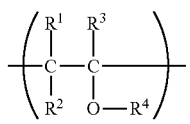

(2)

in the formula (2), $R^1$ to $R^3$ each independently represent a fluorine atom or a perfluoroalkyl group having 1 to 7 carbon atoms, $R^4$ represents a perfluoroalkyl group having 1 to 7 carbon atoms, the perfluoroalkyl group optionally has a ring structure, one or some of the fluorine atoms are optionally substituted by a halogen atom other than a fluorine atom, and one or some of fluorine atoms in the perfluoroalkyl group are optionally substituted by a halogen atom other than a fluorine atom;

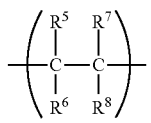

(3)

in the formula (3), $R^5$ to $R^8$ each independently represent a fluorine atom or a perfluoroalkyl group having 1 to 7 carbon atoms, the perfluoroalkyl group optionally has a ring structure, one or some of the fluorine atoms are optionally substituted by a halogen atom other than a fluorine atom, and one or some of fluorine atoms in the perfluoroalkyl group are optionally substituted by a halogen atom other than a fluorine atom; and

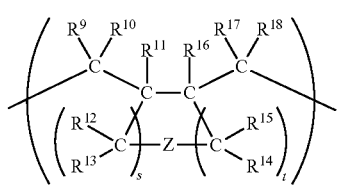

(4)

in the formula (4), Z represents an oxygen atom, a single bond, or —OC($R^{19}R^{20}$)O—, $R^9$ to $R^{20}$ each independently represent a fluorine atom, a perfluoroalkyl group having 1 to 5 carbon atoms, or a perfluoroalkoxy group having 1 to 5 carbon atoms, one or some of the fluorine atoms are optionally substituted by a halogen atom other than a fluorine atom, one or some of fluorine atoms in the perfluoroalkyl group are optionally substituted by a halogen atom other in the formula (3), $R^5$ to $R^8$ each independently represent a fluorine atom or a perfluoroalkyl group having 1 to 7 carbon atoms, the perfluoroalkyl group optionally has a ring structure, one or some of the fluorine atoms are optionally substituted by a halogen atom other than a fluorine atom, and one or some of fluorine atoms in the perfluoroalkyl group are optionally substituted b a halogen atom other than a fluorine atom; and

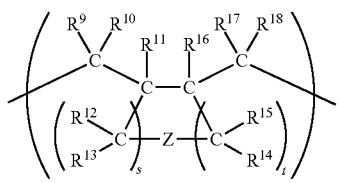

(4)

in the formula (4), Z represents an oxygen atom, a single bond, or —OC($R^{19}R^{20}$)O—, $R^9$ to $R^{20}$ each independently represent a fluorine atom, a perfluoroalkyl group having 1 to 5 carbon atoms, or a perfluoroalkoxy group having 1 to 5 carbon atoms, one or some of the fluorine atoms are optionally substituted by a halogen atom other than a fluorine atom, one or some of fluorine atoms in the perfluoroalkyl group are optionally substituted by a halogen atom other than a fluorine atom, one or some of fluorine atoms in the perfluoroalkoxy group are optionally substituted by a halogen atom other than a fluorine atom, s and t are each independently 0 to 5, and s+t represents an integer of 1 to 6 (when Z is —OC($R^{19}R^{20}$)O—, s+t is optionally 0).

An optical resin composition according to a second aspect of the present invention includes the above fluorine-containing copolymer according to the above first aspect.

An optical resin composition according to a third aspect of the present invention includes the above optical resin composition according to the second aspect.

Advantageous Effects of Invention

The present invention can provide a fluorine-containing resin copolymer being less likely to be thermally decomposed and having high thermal resistance. The present invention can also provide an optical resin composition and optical resin formed body being less likely to be thermally decomposed and having high thermal resistance.

DESCRIPTION OF EMBODIMENTS

Embodiment 1

An embodiment of the fluorine-containing copolymer of the present invention will be described.

perfluoroalkoxy group are optionally substituted by a halogen atom other than a fluorine atom, s and t are each independently 0 to 5, and s+t represents an integer of 1 to 6 (when Z is —OC(R$^{19}$R$^{20}$)O—, s+t is optionally 0).

The fluorine-containing copolymer of the present embodiment includes at least one selected from the group consisting of the structural unit (B), the structural unit (C), and the structural unit (D) in addition to the structural unit (A). Having this structure, the fluorine-containing copolymer of the present embodiment can have a property of being less likely to be thermally decomposed than a fluorine-containing polymer consisting of the structural unit (A). Specifically, it is thought that when the fluorine-containing copolymer of the present embodiment is exposed to high temperatures at which a fluorine-containing polymer consisting of the structural unit (A) would be decomposed by depolymerization, the structural unit (B), the structural unit (C), and/or the structural unit (D) block progress of decomposition of the fluorine-containing copolymer of the present embodiment to make the fluorine-containing copolymer of the present embodiment less likely to be thermally decomposed. Additionally, a fluorine-containing polymer consisting of the structural unit (A) has a high glass transition temperature and high thermal resistance; the fluorine-containing copolymer of the present embodiment, which further includes the structural unit (B), the structural unit (C), and/or the structural unit (D) in addition to the structural unit (A), does not have a greatly lower glass transition temperature than that of a fluorine-containing polymer consisting of the structural unit (A). Therefore, the fluorine-containing copolymer of the present embodiment can maintain as high thermal resistance as that of a fluorine-containing polymer consisting of the structural unit (A). As just described, the fluorine-containing copolymer of the present embodiment can have high thermal resistance as well as the property of being less likely to be thermally decomposed.

The fluorine-containing copolymer of the present embodiment can further achieve high mechanical strength (e.g., high tensile strength).

The fluorine-containing copolymer of the present embodiment can further achieve high transparency. A fluorine-containing polymer consisting of the structural unit (A) has high transparency. On the other hand, the fluorine-containing copolymer of the present embodiment, which further includes the structural unit (B), the structural unit (C), and/or the structural unit (D) in addition to the structural unit (A), does not have a greatly lower transparency. Therefore, the fluorine-containing copolymer of the present embodiment can maintain as high transparency as that of a fluorine-containing polymer consisting of the structural unit (A).

The fluorine-containing copolymer of the present embodiment may be a biopolymer including the structural unit (A) and the structural unit (B), the structural unit (C), or the structural unit (D). The fluorine-containing copolymer of the present embodiment may be a terpolymer including the structural unit (A) and two selected from the group consisting of the structural unit (B), the structural unit (C), and the structural unit (D). The fluorine-containing copolymer of the present embodiment may be a quaterpolymer including the structural unit (A), the structural unit (B), the structural unit (C), and the structural unit (D).

Hereinafter, the structural units (A) to (D) will be described in detail.

(Structural Unit (A))

A fluorine-containing monomer having a fluorine-containing ring structure and forming the structural unit (A) by polymerization is represented by the following formula (9).

$R_{ff}^1$ to $R_{ff}^4$ in the formula (9) are respectively the same as $R_{ff}^1$ to $R_{ff}^4$ in the above formula (1). As in the case of the above formula (1), $R_{ff}^1$ and $R_{ff}^2$ are optionally linked to form a ring.

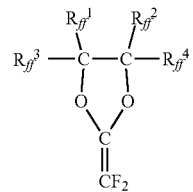

(9)

Specific examples of the fluorine-containing monomer represented by the above formula (9) include compounds represented by the following formulae (9-A) to (9-H).

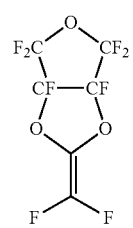

(9-A)

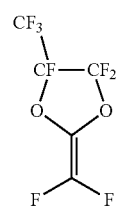

(9-B)

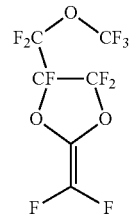

(9-C)

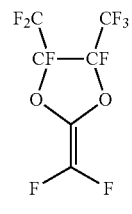

(9-D)

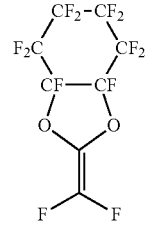

(9-E)

-continued

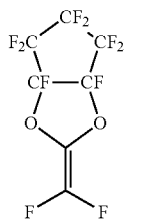
(9-F)

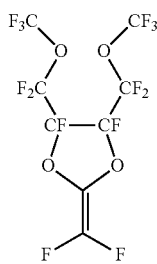
(9-G)

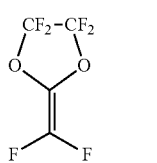
(9-H)

When the compound represented by the formula (9-B) is employed as the fluorine-containing monomer from the compounds represented by the above formulae (9-A) to (9-H), the fluorine-containing copolymer of the present embodiment can have a much higher glass transition temperature. Consequently, the fluorine-containing copolymer can have much higher thermal resistance.

When the compound represented by the formula (9-B) is employed as the fluorine-containing monomer, the structural unit (A) includes a structural unit represented by the following formula (5) in the fluorine-containing copolymer of the present embodiment.

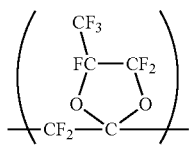
(5)

The fluorine-containing copolymer of the present embodiment may include two or more structural units as the structural unit (A).

In the fluorine-containing copolymer of the present embodiment, a content of the structural unit (A) is preferably 20 mol % or more and more preferably 40 mol % or more relative to a total content of all structural units in the fluorine-containing copolymer of the present embodiment. When including 20 mol % or more of the structural unit (A), the fluorine-containing copolymer of the present embodiment can have much higher thermal resistance. Depending on the structural unit(s) included in the fluorine-containing copolymer of the present embodiment other than the structural unit (A), the fluorine-containing copolymer having such high thermal resistance that the fluorine-containing copolymer has a glass transition temperature of, for example, 105° C. or higher can be achieved when 20 mol % or more of the structural unit (A) is included. When including 40 mol % or more of the structural unit (A), the fluorine-containing copolymer of the present embodiment can have even higher thermal resistance. Depending on the structural unit(s) included in the fluorine-containing copolymer of the present embodiment other than the structural unit (A), the fluorine-containing copolymer having such high thermal resistance that the fluorine-containing copolymer has a glass transition temperature of, for example, 120° C. or higher can be achieved when 40 mol % or more of the structural unit (A) is included. Moreover, when including 40 mol % or more of the structural unit (A), the fluorine-containing copolymer of the present embodiment can also have much higher transparency and much higher mechanical strength in addition to high thermal resistance.

In the fluorine-containing copolymer of the present embodiment, the content of the structural unit (A) is preferably 95 mol % or less and more preferably 70 mol % or less relative to the total content of all structural units in the fluorine-containing copolymer of the present embodiment. When the content of the structural unit (A) is 95 mol % or less, the fluorine-containing copolymer of the present embodiment is much less likely to be thermally decomposed.

When two or more structural units are included as the structural unit (A), the content of the structural unit (A) refers to a total content of all structural units included as the structural unit (A).

(Structural Unit (B))

The structural unit (B) has a structure represented by the above formula (2). As described above, one or some of the fluorine atoms represented by $R^1$ to $R^3$, one or some of the fluorine atoms in the perfluoroalkyl groups represented by $R^1$ to $R^3$, and one or some of the fluorine atoms in the perfluoroalkyl group represented by $R^4$ in the above formula (2) are optionally substituted by a halogen atom other than a fluorine atom. A chlorine atom is preferred as the halogen atom. However, the structural unit (B) particularly preferably has a structure in which no fluorine atoms represented by $R^1$ to $R^3$ and no fluorine atoms in the perfluoroalkyl groups represented by $R^1$ to $R^4$ are substituted by a halogen atom other than a fluorine atom. That is, it is particularly preferable that $R^1$ to $R^3$ each be the fluorine atom or the perfluoroalkyl group and $R^4$ be the perfluoroalkyl group.

The fluorine-containing monomer forming the structural unit (B) by polymerization is a fluorine-containing vinyl ether represented by the following formula (10). $R_f^1$ to $R_f^4$ in the formula (10) are respectively the same as $R_f^1$ to $R^4$ in the above formula (2).

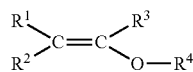
(10)

As described above, as in the above formula (2), one or some of the fluorine atoms represented by $R^1$ to $R^3$, one or some of the fluorine atoms in the perfluoroalkyl groups represented by $R^1$ to $R^3$, and one or some of the fluorine atoms in the perfluoroalkyl group represented by $R^4$ are optionally substituted by a halogen atom other than a fluorine atom in the fluorine-containing vinyl ether represented by the above formula (10). The halogen atom is, for example, a chlorine atom. That is, the fluorine-containing vinyl ether may be chlorofluorovinyl ether.

The number of halogen atoms other than a fluorine atom is preferably two or less and more preferably one or less in the fluorine-containing vinyl ether used as the monomer. The most preferable fluorine-containing vinyl ether has a structure in which no fluorine atoms represented by $R^1$ to $R^3$ and no fluorine atoms in the perfluoroalkyl groups represented by $R^1$ to $R^4$ are substituted by a halogen atom other than a fluorine atom, and is, namely, perfluorovinyl ether.

Specific examples of the fluorine-containing vinyl ether used as the monomer include trifluoromethyl trifluorovinyl ether represented by the following formula (10-A), pentafluoroethyl trifluorovinyl ether represented by the following formula (10-B), and heptafluoropropyl trifluorovinyl ether represented by the following formula (10-C).

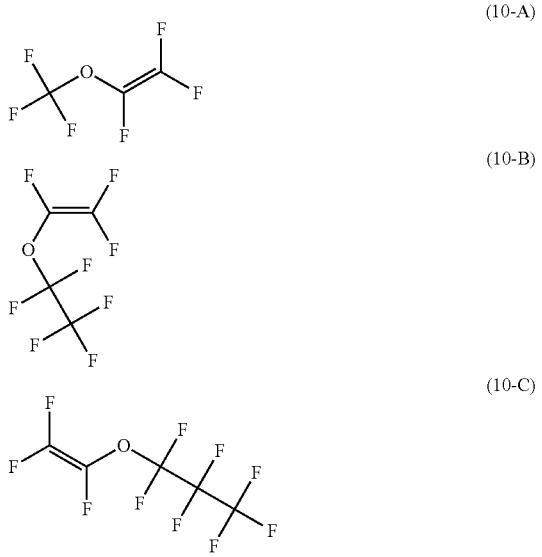

The fluorine-containing copolymer of the present embodiment may include two or more structural units as the structural unit (B).

When the fluorine-containing copolymer of the present embodiment includes the structural unit (B), a content of the structural unit (B) is preferably 5 to 10 mol % relative to the total content of all structural units in the fluorine-containing copolymer. When the content of the structural unit (B) is 5 mol % or more, the fluorine-containing copolymer of the present embodiment is much less likely to be thermally decomposed. When the content of the structural unit (B) is 10 mol % or less, the fluorine-containing copolymer of the present embodiment can have a glass transition temperature of, for example, 120° C. or higher and can maintain much higher thermal resistance. The content of the structural unit (B) may be 9 mol % or less or 8 mol % or less to achieve the fluorine-containing copolymer having much higher thermal resistance.

When two or more structural units are included as the structural unit (B), the content of the structural unit (B) refers to a total content of all structural units included as the structural unit (B).

(Structural Unit (C))

The structural unit (C) has a structure represented by the above formula (3). As described above, one or some of the fluorine atoms represented by $R^5$ to $R^8$ and one or some of the fluorine atoms in the perfluoroalkyl groups represented by $R^5$ to $R^8$ in the above formula (3) are optionally substituted by a halogen atom other than a fluorine atom. A chlorine atom is preferred as the halogen atom. However, the structural unit (C) particularly preferably has a structure in which no fluorine atoms represented by $R^5$ to $R^8$ and no fluorine atoms in the perfluoroalkyl groups represented by $R^5$ to $R^8$ are substituted by a halogen atom other than a fluorine atom. That is, it is particularly preferable that $R^5$ to $R^8$ each be the fluorine atom or the perfluoroalkyl group.

A fluorine-containing monomer forming the structural unit (C) by polymerization is a fluorine-containing olefin represented by the following formula (11). $R^5$ to $R^8$ in the formula (11) are respectively the same as $R^5$ to $R^8$ in the above formula (3).

As described above, as in the case of the above formula (3), one or some of the fluorine atoms represented by $R^5$ to $R^8$ and one or some of the fluorine atoms in the perfluoroalkyl groups represented by $R^5$ to $R^8$ in the above formula (3) are optionally substituted by a halogen atom other than a fluorine atom in the fluorine-containing olefin represented by the above formula (11). The halogen atom is, for example, a chlorine atom. That is, the fluorine-containing olefin may be chlorofluoroolefin.

The number of halogen atoms other than a fluorine atom is preferably two or less and more preferably one or less in the fluorine-containing olefin used as the monomer. The most preferable fluorine-containing vinyl ether has a structure in which no fluorine atoms represented by $R^5$ to $R^8$ and no fluorine atoms in the perfluoroalkyl groups represented by $R^5$ to $R^8$ are substituted by a halogen atom other than a fluorine atom, and is, namely, perfluorovinyl ether.

Specific examples of the fluorine-containing olefin used as the monomer include tetrafluoroethylene and chlorotrifluoroethylene.

The fluorine-containing copolymer of the present embodiment may include two or more structural units as the structural unit (C).

When the fluorine-containing copolymer of the present embodiment includes the structural unit (C), a content of the structural unit (C) is preferably 5 to 10 mol % relative to the total content of all structural units in the fluorine-containing copolymer. When the content of the structural unit (C) is 5 mol % or more, the fluorine-containing copolymer of the present embodiment is much less likely to be thermally decomposed. When the content of the structural unit (C) is 10 mol % or less, the fluorine-containing copolymer of the present embodiment can have a glass transition temperature of, for example, 120° C. or higher and can maintain much higher thermal resistance. The content of the structural unit (C) may be 9 mol % or less or 8 mol % or less to achieve the fluorine-containing copolymer having much higher thermal resistance.

When two or more structural units are included as the structural unit (C), the content of the structural unit (C) refers to a total content of all structural units included as the structural unit (C).

(Structural Unit (D))

The structural unit (D) can impart much higher thermal resistance to the fluorine-containing copolymer than the structural units (B) and (C). Therefore, the fluorine-containing copolymer of the present embodiment preferably includes the structural unit (D) in terms of thermal resistance.

The structural unit (D) has a structure represented by the above formula (4). As described above, one or some of the fluorine atoms represented by $R^9$ to $R^{20}$, one or some of the fluorine atoms in the perfluoroalkyl groups represented by $R^9$ to $R^{20}$, and one or some of the fluorine atoms in the perfluoroalkoxy groups represented by $R^9$ to $R^{20}$ in the above formula (4) are optionally substituted by a halogen atom other than a fluorine atom. A chlorine atom is preferred as the halogen atom. However, the structural unit (D) particularly preferably has a structure in which no fluorine atoms represented by $R^9$ to $R^{20}$ and no fluorine atoms in the perfluoroalkyl groups and the perfluoroalkoxy groups represented by $R^9$ to $R^{20}$ are substituted by a halogen atom other than a fluorine atom. That is, it is particularly preferable that $R^9$ to $R^{20}$ each be the fluorine atom, the perfluoroalkyl group, or the perfluoroalkoxy group.

The structural unit (D) may include a structural unit represented by the following formula (6). The structural unit (D) may be the structural unit represented by the following formula (6). The structural unit represented by the following formula (6) is a structural unit represented by the above formula (4), where Z is an oxygen atom, s is 0, and t is 2.

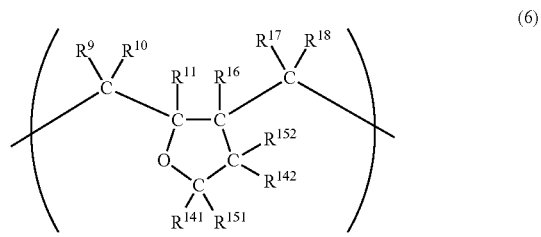

In the formula (6), $R^{141}$, $R^{142}$, $R^{151}$, and $R^{152}$ each independently represent a fluorine atom, a perfluoroalkyl group having 1 to 5 carbon atoms, or a perfluoroalkoxy group having 1 to 5 carbon atoms, one or some of the fluorine atoms are optionally substituted by a halogen atom other than a fluorine atom, one or some of fluorine atoms in the perfluoroalkyl group are optionally substituted by a halogen atom other than a fluorine atom, and one or some of fluorine atoms in the perfluoroalkoxy group are optionally substituted by a halogen atom other than a fluorine atom.

As described above, in the formula (6), one or some of the fluorine atoms represented by $R^{141}$, $R^{142}$, $R^{151}$, and $R^{152}$, one or some of the fluorine atoms in the perfluoroalkyl groups represented by $R^{141}$, $R^{142}$, $R^{151}$, and $R^{152}$, and one or some of the fluorine atoms in the perfluoroalkoxy groups represented by $R^{141}$, $R^{142}$, $R^{151}$, and $R^{152}$ are optionally substituted by a halogen atom other than a fluorine atom. A chlorine atom is preferred as the halogen atom. However, the structural unit represented by the formula (6) particularly preferably has a structure in which no fluorine atoms represented by $R^{141}$, $R^{142}$, $R^{151}$, and $R^{152}$ and no fluorine atoms in the perfluoroalkyl groups and the perfluoroalkoxy groups represented by $R^{141}$, $R^{142}$, $R^{151}$, and $R^{152}$ are substituted by a halogen atom other than a fluorine atom. That is, it is particularly preferable that $R^{141}$, $R^{142}$, $R^{151}$, and $R^{152}$ each be the fluorine atom, the perfluoroalkyl group, or the perfluoroalkoxy group.

The structural unit (D) may include a structural unit represented by the following formula (7). The structural unit (D) may be the structural unit represented by the following formula (7). The structural unit represented by the following formula (7) is a structural unit represented by the above formula (6), where $R^9$ to $R^{11}$, $R^{16}$ to $R^{18}$, $R^{141}$, $R^{142}$, $R^{151}$, and $R^{152}$ are each a fluorine atom.

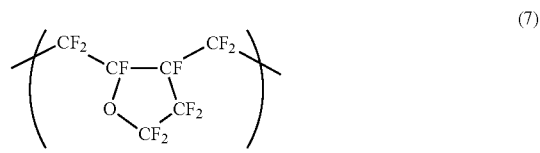

The fluorine-containing copolymer of the present embodiment including the structural unit represented by the above formula (7) can achieve much higher thermal resistance.

The structural unit (D) may include a structural unit represented by the following formula (8). The structural unit (D) may be the structural unit represented by the following formula (8).

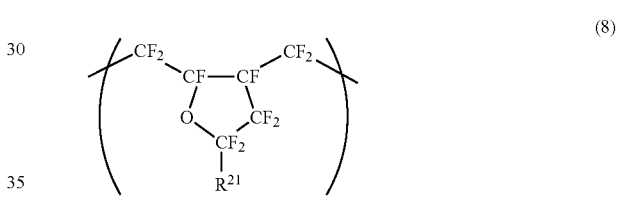

In the formula (8), $R^{21}$ represents a perfluoroalkyl group having 1 to 4 carbon atoms.

$R^{21}$ in the above formula (8) is preferably a methyl group because an increase in the number of carbon atoms causes a decrease in glass transition temperature.

The structural unit represented by the above formula (8) can impart higher thermal resistance to the fluorine-containing copolymer of the present embodiment, for example, than the structural unit represented by the above formula (7) does. Therefore, the structural unit (D) preferably includes the structural unit represented by the above formula (8) to further improve the thermal resistance of the fluorine-containing copolymer of the present embodiment. On the other hand, the structural unit represented by the above formula (7) can impart, in addition to high thermal resistance, high mechanical strength (e.g., high tensile strength) to the fluorine-containing copolymer of the present embodiment. Therefore, for example, the structural unit (D) may include both the structural unit represented by the above formula (7) and the structural unit represented by the above formula (8) for further improvement in thermal resistance and mechanical strength.

A fluorine-containing monomer having two polymerizable double bonds and forming the structural unit (D) represented by the above formula (4) by cyclopolymerization is, for example, a fluorine-containing diene monomer represented by the following formula (12). Z, $R^9$ to $R^{20}$, s, and t in the formula (12) are respectively the same as Z, $R^9$ to $R^{20}$, s, and t in the above formula (4).

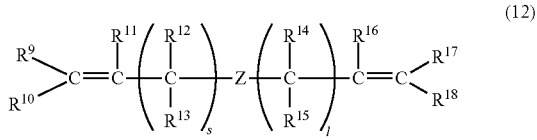

(12)

A fluorine-containing monomer having two polymerizable double bonds and forming the structural unit represented by the above formula (6) by cyclopolymerization is, for example, a fluorine-containing diene monomer represented by the following formula (13). $R^{141}$, $R^{142}$, $R^{151}$, and $R^{152}$ in the formula (13) are respectively the same as $R^{141}$, $R^{142}$, $R^{151}$, and $R^{152}$ in the above formula (6).

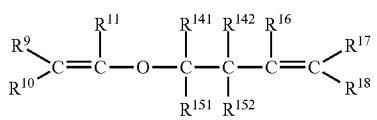

(13)

Specific examples of the fluorine-containing diene monomer represented by the above formula (12) or (13) include the following compounds.

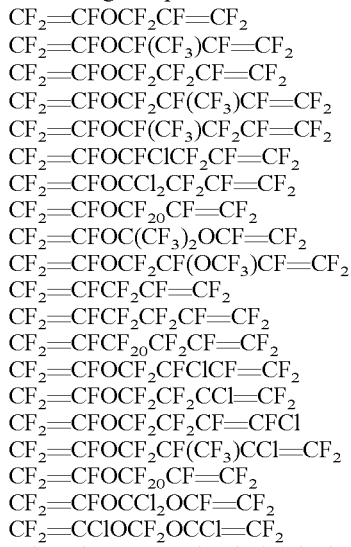

When the structural unit (D) includes the structural unit represented by the above formula (7), $CF_2=CFOCF_2CF=CF_2$ is used as the fluorine-containing diene monomer. When the structural unit (D) includes the structural unit represented by the above formula (8), for example, $CF_2=CFOCF(CF_3)CF_2CF=CF_2$ is used as the fluorine-containing diene monomer.

The fluorine-containing copolymer of the present embodiment may include two or more structural units as the structural unit (D).

When the fluorine-containing copolymer of the present embodiment includes the structural unit (D), a content of the structural unit (D) is preferably 30 to 67 mol % relative to the total content of all structural units in the fluorine-containing copolymer. When the content of the structural unit (D) is 30 mol % or more, the fluorine-containing copolymer of the present embodiment is much less likely to be thermally decomposed. When the content of the structural unit (D) is 67 mol % or less, the fluorine-containing copolymer of the present embodiment can have a glass transition temperature of, for example, 120° C. or higher and can maintain much higher thermal resistance. The content of the structural unit (D) may be 35 mol % or more to achieve the fluorine-containing copolymer much less likely to be thermally decomposed. The content of the structural unit (D) may be 60 mol % or less or 55 mol % or less to achieve the fluorine-containing copolymer having much higher thermal resistance.

When two or more structural units are included as the structural unit (D), the content of the structural unit (D) herein refers to a total content of all structural units included as the structural unit (D).

To achieve a fluorine-containing copolymer having high thermal resistance, high mechanical strength, and high transparency and being less likely to be thermally decomposed, the fluorine-containing copolymer of the present embodiment may include a combination of two or more of the structural units (B) to (D). As described above, the fluorine-containing copolymer of the present embodiment may include a plurality of structural units as each of the structural units (B) to (D). Preferred examples of the fluorine-containing copolymer of the present embodiment include (i) and (ii) below besides a fluorine-containing copolymer including a combination of the structural unit represented by the above formula (7) and the structural unit represented by the above formula (8) along with the structural unit (A).
  (i) A fluorine-containing copolymer including a structural unit (corresponding to the structural unit (B)) formed by polymerization of a fluorovinyl ether (particularly, perfluorovinyl ether) and the structural unit represented by the above formula (7) (corresponding to the structural unit (D)) along with the structural unit (A)
  (ii) A fluorine-containing copolymer including the structural unit (C) and the structural unit represented by the above formula (7) (corresponding to the structural unit (D)) along with the structural unit (A)

The fluorine-containing copolymer of the present embodiment may further include an additional structural unit other than the structural units (A) to (D). However, to maintain high thermal resistance, high mechanical strength, and high transparency and achieve the property of being less likely to be thermally decomposed, the fluorine-containing copolymer of the present embodiment is preferably substantially free of an additional structural unit other than the structural units (A) to (D). That the fluorine-containing copolymer of the present embodiment is substantially free of an additional structural unit other than the structural units (A) to (D) means that a total content of the structural units (A) to (D) is 95 mol % or more and preferably 98 mol % or more relative to the total content of all structural units in the fluorine-containing copolymer of the present embodiment.

The fluorine-containing copolymer of the present embodiment can be produced, for example, using a polymerization initiator by polymerization of the fluorine-containing monomer forming the structural unit (A) by polymerization and a fluorine-containing monomer forming at least one structural unit selected from the group consisting of the structural unit (B), the structural unit (C), and the structural unit (D) by polymerization. A known polymerization initiator used for polymerization of a fluorine-containing polymer can be used as the polymerization initiator. A compound used as the polymerization initiator is preferably fluorinated. It is more preferable that every hydrogen atom in a substituent is substituted by a fluorine atom. That is, the compound used as the polymerization initiator is more preferably fully fluorinated. Preferable examples of the polymerization initiator include perfluorobenzoyl peroxide, perfluorohexyl peroxide, and $N_2F_2$. A known polymerization method can be used for the polymerization. For example, polymerization methods such as bulk polymerization, solution polymerization, dispersion polymerization, emulsion polymerization, and vapor phase polymerization can be used. For example, the fluorine-containing copolymer of the present embodiment can be produced by radical polymerization of the above fluorine-containing monomers by a conventional method. A fully fluorinated fluorine-containing copolymer may be produced using fully fluorinated compounds as the fluorine-containing monomers and a polymerization initiator consisting of a fully fluorinated compound.

A polymer having a fluorine-containing aliphatic ring structure, such as the fluorine-containing copolymer of the present embodiment, sometimes has an unstable functional group at its terminal at the beginning of polymerization. Therefore, it is preferable that terminal stabilization treatment, in which the polymer is fluorinated by fluorine, be performed after production of the polymer.

Embodiment 2

An embodiment of the optical resin composition of the present invention will be described.

The optical resin composition of the present embodiment includes the fluorine-containing copolymer of the embodiment 1. The optical resin composition of the present embodiment may include a refractive index modifier for adjustment of a refractive index, depending on its intended use. For example, when the optical resin composition of the present embodiment is used as the material of a POF, particularly, the core material of a graded-index POF in which a refractive index distribution of a core is symmetric with respect to a central axis, the refractive-index distribution can be formed by diffusing the refractive index modifier in the optical resin composition.

As described in the embodiment 1, the fluorine-containing copolymer included in the optical resin composition of the present embodiment can have a high glass transition temperature. Therefore, the optical resin composition of the present embodiment is only slightly affected by a glass transition temperature decrease attributable to the addition of the refractive index modifier and can maintain a high glass transition temperature. That is, the optical resin composition of the present embodiment can achieve a desirable refractive index and high thermal resistance. Additionally, since the decreasing effect on the glass transition temperature does not need to be taken into account, a benefit can be obtained in that a compound that can be used as the refractive index modifier can be selected from a wider range of compounds.

The optical resin composition of the present embodiment may include an additional additive other than the refractive index modifier depending on its intended use. As described above, the fluorine-containing copolymer included in the optical resin composition of the present embodiment can have a high glass transition temperature. Therefore, even when the glass transition temperature is decreased by inclusion of the additional additive, the optical resin composition of the present embodiment can maintain a high glass transition temperature.

The glass transition temperature of the optical resin composition of the present embodiment is preferably, but not particularly limited to, 105° C. or higher and more preferably 120° C. or higher. The optical resin composition of the present embodiment having such a glass transition temperature can achieve high thermal resistance. The upper limit of the glass transition temperature of the optical resin composition of the present embodiment may be, for example, but not particularly limited to, 140° C. or lower.

As described in the embodiment 1, the fluorine-containing copolymer included in the optical resin composition of the present embodiment is less likely to be thermally decomposed. Thus, the optical resin composition of the present embodiment can stay in a stable state and keep its characteristics, for example, even when used for an application in which the optical resin composition of the present embodiment may be exposed to high temperatures in processing thereof. Therefore, the optical resin composition of the present embodiment can be used for various applications and has high reliability.

As described in the embodiment 1, the fluorine-containing copolymer included in the optical resin composition of the present embodiment can have high mechanical strength. Thus, the optical resin composition of the present embodiment can have high mechanical strength, and thus can also be used for an application in which high mechanical strength is required.

As described in the embodiment 1, the fluorine-containing copolymer included in the optical resin composition of the present embodiment can have high transparency. Thus, the optical resin composition of the present embodiment can have high transparency, and thus can also be used for an application in which high transparency is required.

Embodiment 3

An embodiment of the optical resin formed body of the present invention will be described.

The optical resin formed body of the present embodiment includes the optical resin composition of the embodiment 2. As described in the embodiment 2, the optical resin composition of the embodiment 2 maintains high thermal resistance and has high stability, i.e., less likelihood of thermal decomposition. Moreover, the refractive index of the optical resin composition of the embodiment 2 can be adjusted within a desired range using the refractive index modifier. Therefore, the optical resin formed body of the present embodiment can be suitably used, for example, for optical transmitting bodies (such as POFs and materials of optical waveguides), optical lens, and prisms. The optical resin formed body of the present embodiment can be suitably applied to optical transmitting bodies, and is particularly suitably applied to POFs.

When the optical resin formed body of the present embodiment is a POF, the optical resin formed body of the present embodiment preferably includes the optical resin composition including the fluorine-containing copolymer to which the refractive index modifier is added. In this case, the optical resin formed body of the present embodiment can be used, for example, as the core material of a graded-index POF in which a refractive index distribution of a core is symmetric with respect to a central axis. The refractive-Index distribution of such a graded-index POF can be easily formed by diffusing the refractive index modifier in the optical resin formed body. The optical resin formed body of the present embodiment may be used as the clad material of a POF.

The optical resin formed body of the present embodiment can be produced, for example, by a production method including a step of melting the optical resin composition of the embodiment 2 by heating at a temperature higher than the glass transition temperature of the optical resin composition by 50° C. or higher and forming the optical resin composition of the embodiment 2 into a given shape. An optical resin formed body having a refractive-index distribution can be obtained, for example, by thermal diffusion of the refractive index modifier in the optical resin composition during the heating of the optical resin composition. As described in the embodiment 2, the optical resin composition that is included in the optical resin formed body of the present embodiment is less likely to be thermally decomposed. Because of this, the optical resin composition that is included in the optical resin formed body of the present embodiment can also undergo processing at high temperatures. This makes it possible to apply the optical resin formed body of the present embodiment to a formed body that requires processing at high temperatures in the formation thereof.

A specific formation method is determined as appropriate depending on the intended use. That is, a formation method known to be employed for an intended use can be used. For example, when the optical resin formed body of the present embodiment is a POF, the formed body can be produced, for example, by spinning the optical resin composition into a fibrous form by melt extrusion. A core of a graded-index POF in which a refractive index distribution of a core is symmetric with respect to a central axis can be produced by, in the spinning by melt extrusion, diffusing the refractive index modifier in the optical resin composition by heating.

EXAMPLES

Hereinafter, the present invention will be described in more detail by way of examples. The present invention is not limited to the following examples.

Example 1

<Production of Fluorine-Containing Copolymer>

An amount of 24.4 g of perfluoro-2-methylene-4-methyl-1,3-dioxolane, 27.8 g of perfluoro(4-vinyloxy-1-butene), and 1.00 L of 1,1,1,2,2,3,4,5,5,5-decafluoropentane ("Vertrel XF" manufactured by Chemours-Mitsui Fluoroproducts Co., Ltd.) were mixed in an argon atmosphere at room temperature. The perfluoro-2-methylene-4-methyl-1,3-dioxolane is a fluorine-containing monomer having a fluorine-containing ring structure and forming the structural unit (A) by polymerization, and is represented by the above formula (9-B). The perfluoro(4-vinyloxy-1-butene) is a fluorine-containing diene monomer forming, by cyclopolymerization, a structural unit being the structural unit (D) and represented by the above formula (7). In this Example, the perfluoro-2-methylene-4-methyl-1,3-dioxolane and the perfluoro(4-vinyloxy-1-butene) were used at a molar ratio of 1:1.

While the argon atmosphere was being maintained, 0.281 g of perfluorobenzoyl peroxide was added to the mixed system and the resulting system was stirred and mixed. After the mixing, dissolved oxygen in the system was removed by freeze-pump-thaw cycling. The system was heated at 40° C. under stirring to perform a reaction for 72 hours. The resulting reaction mixture was concentrated to 300 mL in total solution volume. The concentrated solution was added to 3.00 L of chloroform, and the resulting precipitate was collected by filtration. The obtained residue was a copolymer of the perfluoro-2-methylene-4-methyl-1,3-dioxolane and the perfluoro(4-vinyloxy-1-butene). The yield was 36.3 g, and the percentage yield was 72.0%. That is, a fluorine-containing copolymer of Example 1 was a copolymer including one structural unit (A) and one structural unit (D), and the content of the structural unit (D) was 50 mol %.

<Glass Transition Temperature of Fluorine-Containing Copolymer>

The fluorine-containing copolymer of Example 1 was measured for its glass transition temperature. Conditions for the glass transition temperature measurement were as follows. About 5 mg of a measurement sample, namely, a powder of the fluorine-containing copolymer of Example 1, was taken and put in an aluminum container. Differential scanning calorimetry (DSC measurement) was then performed. An apparatus used was a differential scanning calorimeter Q-2000 manufactured by TA Instruments Japan Inc. A temperature program was set to change the temperature from −80° C. to 200° C., a measurement rate was 10° C./min, and an atmosphere gas was $N_2$ (50 m/min). The fluorine-containing copolymer of Example 1 had a glass transition temperature of 115° C.

<Evaluation of Thermal Decomposition of Fluorine-Containing Copolymer>

Thermogravimetric and differential thermal analysis (TG-DTA) was performed to evaluate thermal decomposition of the fluorine-containing copolymer of Example 1. An amount of 1 mg of a powder of the fluorine-containing copolymer of Example 1 was weighed out and measured using a simultaneous thermal analyzer SDT650 manufactured by TA Instruments Japan Inc. The fluorine-containing copolymer of Example 1 had a 5% weight loss temperature of 439°. That is, the fluorine-containing copolymer of Example 1 had a thermal decomposition starting temperature of 439° C.

<Tensile Elongation of Fluorine-Containing Copolymer>

The fluorine-containing copolymer of Example 1 was measured for its tensile elongation by a tensile test. A measurement sample was obtained by forming the fluorine-containing copolymer of Example 1 into a 1 cm×6 cm piece having a thickness of 100 μm. The measurement sample was measured for its tensile elongation using Autograph AGX-V manufactured by Shimadzu Corporation. The measurement sample had a tensile elongation of 145%. As to conditions for the tensile elongation measurement, the distance between grips was 5 cm, and the tensile rate was 10 cm/min. The term "tensile elongation" refers to elongation of a measurement sample with respect to the length of the measurement sample measured before the tensile test, the elongation being obtained when the measurement sample is broken in the tensile test.

<Light Transmittance of Fluorine-Containing Copolymer>

The fluorine-containing copolymer of Example 1 was measured for its light transmittance. An amount of 1 mg of the fluorine-containing copolymer of Example 1 was dissolved in 10 mL of Vertrel XF manufactured by Chemours-Mitsui Fluoroproducts Co., Ltd. to prepare a measurement sample. The prepared measurement sample was introduced in a quartz cell having an optical path length of 1 cm and measured for its transmittance at a light wavelength of 850 nm using a UV-visible-IR spectrophotometer V-570 manufactured by JASCO Corporation. The measurement sample had a transmittance of 100% at alight wavelength of 850 nm.

Example 2

<Production of Fluorine-Containing Copolymer>

An amount of 24.4 g of perfluoro-2-methylene-4-methyl-1,3-dioxolane, 32.8 g of perfluoro(4-vinyloxy-4'-methyl-1-butene), and 1.00 L of 1,1,1,2,2,3,4,5,5,5-decafluoropentane ("Vertrel XF" manufactured by Chemours-Mitsui Fluoroproducts Co., Ltd.) were mixed at room temperature in an argon atmosphere. The perfluoro-2-methylene-4-methyl-1,3-dioxolane is a fluorine-containing monomer having a fluorine-containing ring structure and forming the structural unit (A) by polymerization, and is represented by the above formula (9-B). The perfluoro(4-vinyloxy-4-methyl-1-butene) is a fluorine-containing diene monomer forming, by cyclopolymerization, a structural unit being the structural unit (D) and represented by the above formula (8) (where $R^{21}$ is a perfluoromethyl group). In this Example, the perfluoro-2-methylene-4-methyl-1,3-dioxolane and the perfluoro(4-vinyloxy-4'-methyl-1-butene) were used at a molar ratio of 1:1.

While the argon atmosphere was being maintained, 0.281 g of perfluorobenzoyl peroxide was added to the mixed system and the resulting system was stirred and mixed. After the mixing, dissolved oxygen in the system was removed by freeze-pump-thaw cycling. The system was heated at 40° C. under stirring to perform a reaction for 72 hours. The resulting reaction mixture was concentrated to 300 mL in total solution volume. The concentrated solution was added to 3.00 L of chloroform, and the resulting precipitate was collected by filtration. The obtained residue was a copolymer of the perfluoro-2-methylene-4-methyl-1,3-dioxolane and the perfluoro(4-vinyloxy-4'-methyl-1-butene). The yield was 43.8 g, and the percentage yield was 79.0%. That is, a fluorine-containing copolymer of Example 2 was a copolymer including one structural unit (A) and one structural unit (D), and the content of the structural unit (D) was 50 mol %.

<Glass Transition Temperature of Fluorine-Containing Copolymer>

The fluorine-containing copolymer of Example 2 was measured for its glass transition temperature in the same manner as in Example 1. The fluorine-containing copolymer of Example 2 had a glass transition temperature of 120° C.

<Evaluation of Thermal Decomposition of Fluorine-Containing Copolymer>

The fluorine-containing copolymer of Example 2 was measured by TG-DTA in the same manner as in Example 1. The fluorine-containing copolymer of Example 2 had a 5% weight loss temperature of 443° C. That is, the fluorine-containing copolymer of Example 2 had a thermal decomposition starting temperature of 443° C.

<Tensile Elongation of Fluorine-Containing Copolymer>

The fluorine-containing copolymer of Example 2 was measured for its tensile elongation in the same manner as in Example 1. The fluorine-containing copolymer of Example 2 had a tensile elongation of 118%.

<Light Transmittance of Fluorine-Containing Copolymer>

The fluorine-containing copolymer of Example 2 was measured for its light transmittance in the same manner as in Example 1. The fluorine-containing copolymer of Example 2 had a transmittance of 100% at alight wavelength of 850 nm.

Example 3

<Production of Fluorine-Containing Copolymer>

An amount of 14.6 g of perfluoro-2-methylene-4-methyl-1,3-dioxolane, 16.7 g of perfluoro(4-vinyloxy-1-butene), 19.7 g of perfluoro(4-vinyloxy-4'-methyl-1-butene), and 1.00 L of 1,1,2,2,3,4,5,5,5-decafluoropentane ("Vertrel XF" manufactured by Chemours-Mitsui Fluoroproducts Co., Ltd.) were mixed in an argon atmosphere at room temperature. The perfluoro-2-methylene-4-methyl-1,3-dioxolane is a fluorine-containing monomer having a fluorine-containing ring structure and forming the structural unit (A) by polymerization, and is represented by the above formula (9-B). The perfluoro(4-vinyloxy-1-butene) is a fluorine-containing diene monomer forming, by cyclopolymerization, a structural unit being the structural unit (D) and represented by the above formula (7). The perfluoro(4-vinyloxy-4'-methyl-1-butene) is a fluorine-containing diene monomer forming, by cyclopolymerization, a structural unit being the structural unit (D) and represented by the above formula (8) (where $R^{21}$ is a perfluoromethyl group). In this Example, the perfluoro-2-methylene-4-methyl-1,3-dioxolane, the perfluoro(4-vinyloxy-1-butene), and the perfluoro(4-vinyloxy-4'-methyl-1-butene) were used at a molar ratio of 1:1:1.

While the argon atmosphere was being maintained, 0.281 g of perfluorobenzoyl peroxide was added to the mixed system and the resulting system was stirred and mixed. After the mixing, dissolved oxygen in the system was removed by freeze-pump-thaw cycling. The system was heated at 40° C. under stirring to perform a reaction for 72 hours. The resulting reaction mixture was concentrated to 300 mL in total solution volume. The concentrated solution was added to 3.00 L of chloroform, and the resulting precipitate was collected by filtration. The obtained residue was a terpolymer of the perfluoro-2-methylene-4-methyl-1,3-dioxolane, the perfluoro(4-vinyloxy-1-butene), and the perfluoro(4-vinyloxy-4'-methyl-1-butene). The yield was 40.9 g, and the percentage yield was 72.0%. That is, a fluorine-containing copolymer of Example 3 was a copolymer including one structural unit (A) and two structural units (D), and the content of the structural unit (D) was 66.7 mol %.

<Glass Transition Temperature of Fluorine-Containing Copolymer>

The fluorine-containing copolymer of Example 3 was measured for its glass transition temperature in the same manner as in Example 1. The fluorine-containing copolymer of Example 3 had a glass transition temperature of 118° C.

<Evaluation of Thermal Decomposition of Fluorine-Containing Copolymer>

The fluorine-containing copolymer of Example 3 was measured by TG-DTA in the same manner as in Example 1. The fluorine-containing copolymer of Example 3 had a 5% weight loss temperature of 441° C. That is, the fluorine-containing copolymer of Example 3 had a thermal decomposition starting temperature of 441° C.

<Tensile Elongation of Fluorine-Containing Copolymer>

The fluorine-containing copolymer of Example 3 was measured for its tensile elongation in the same manner as in Example 1. The fluorine-containing copolymer of Example 3 had a tensile elongation of 131%.

<Light Transmittance of Fluorine-Containing Copolymer>

The fluorine-containing copolymer of Example 3 was measured for its light transmittance in the same manner as in Example 1. The fluorine-containing copolymer of Example 3 had a transmittance of 100% at alight wavelength of 850 nm.

Comparative Example 1

<Production of Fluorine-Containing Polymer>

A fluorine-containing polymer of Comparative Example 1 was produced in the same manner as in Example 1, except that perfluoro(4-vinyloxy-1-butene) was not used and perfluoro-2-methylene-4-methyl-1,3-dioxolane was used alone as a monomer. That is, the fluorine-containing polymer of Comparative Example 1 was a polymer including only one structural unit (A) and obtained by homopolymerization of perfluoro-2-methylene-4-methyl-1,3-dioxolane.

<Glass Transition Temperature of Fluorine-Containing Polymer>

The fluorine-containing polymer of Comparative Example 1 was measured for its glass transition temperature in the same manner as in Example 1. The fluorine-containing polymer of Comparative Example 1 had a glass transition temperature of 135° C.

<Evaluation of Thermal Decomposition of Fluorine-Containing Polymer>

The fluorine-containing copolymer of Comparative Example 1 was measured by TG-DTA in the same manner as in Example 1. The fluorine-containing polymer of Comparative Example 1 had a 5% weight loss temperature of 401° C. That is, the fluorine-containing polymer of Comparative Example 1 had a thermal decomposition starting temperature of 401° C.

<Tensile Elongation of Fluorine-Containing Polymer>

The fluorine-containing polymer of Comparative Example 1 was measured for its tensile elongation in the same manner as in Example 1. The fluorine-containing polymer of Comparative Example 1 had a tensile elongation of 2%.

<Light Transmittance of Fluorine-Containing Polymer>

The fluorine-containing copolymer of Comparative Example 1 was measured for its light transmittance in the same manner as in Example 1. The fluorine-containing polymer of Comparative Example 1 had a transmittance of 100% at a light wavelength of 850 nm.

Table 1 below shows the results of measuring Examples 1 to 3 and Comparative Example 1 for the evaluation items.

TABLE 1

| | Glass transition temperature | Thermal decomposition starting temperature (5% weight loss temperature) | Tensile elongation | Light transmittance (Light wavelength: 850 nm) |
|---|---|---|---|---|
| Example 1 | 115° C. | 439° C. | 145% | 100% |
| Example 2 | 120° C. | 443° C. | 118% | 100% |
| Example 3 | 118° C. | 441° C. | 131% | 100% |
| Comparative Example 1 | 135° C. | 401° C. | 2% | 100% |

It has been confirmed from the above results that the fluorine-containing copolymer of the present invention is less likely to be thermally decomposed and has high thermal resistance. It has also been confirmed that the fluorine-containing copolymer of the present invention also have high mechanical strength and high transparency.

INDUSTRIAL APPLICABILITY

The present invention achieves a fluorine-containing copolymer being less likely to be thermally decomposed and having high thermal resistance. Therefore, the present invention can be suitably used for, for example, applications in which processing at high temperatures is required, such as optical applications, for example, a POF.

The invention claimed is:
1. A fluorine-containing copolymer comprising:
a structural unit (A) represented by the following formula (1); and
at least one selected from the group consisting of a structural unit (B) represented by the following formula (2), a structural unit (C) represented by the following formula (3), and a structural unit (D) represented by the following formula (4):

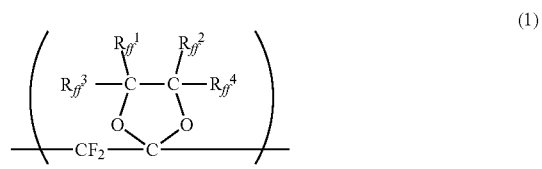

in formula (1), $R_{ff}^1$ to $R_{ff}^4$ each independently represent a fluorine atom, a perfluoroalkyl group having 1 to 7 carbon atoms, or a perfluoroalkyl ether group having 1 to 7 carbon atoms, and $R_{ff}^1$ and $R_{ff}^2$ are optionally linked to form a ring;

in formula (2), $R^1$ to $R^3$ each independently represent a fluorine atom or a perfluoroalkyl group having 1 to 7 carbon atoms, $R^4$ represents a perfluoroalkyl group having 1 to 7 carbon atoms, the perfluoroalkyl group optionally has a ring structure, one or some of the fluorine atoms are optionally substituted by a halogen atom other than a fluorine atom, and one or some of fluorine atoms in the perfluoroalkyl group are optionally substituted by a halogen atom other than a fluorine atom;

in the formula (3), $R^5$ to $R^8$ each independently represent a fluorine atom or a perfluoroalkyl group having 1 to 7 carbon atoms, the perfluoroalkyl group optionally has a ring structure, one or some of the fluorine atoms are optionally substituted by a halogen atom other than a fluorine atom, and one or some of fluorine atoms in the perfluoroalkyl group are optionally substituted by a halogen atom other than a fluorine atom; and

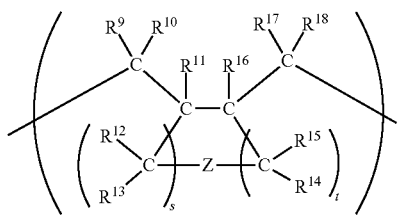

(4)

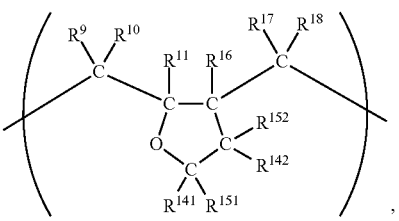

(6)

in formula (4), Z represents an oxygen atom, a single bond, or —OC($R^{19}R^{20}$)O—, $R^9$ to $R^{20}$ each independently represent a fluorine atom, a perfluoroalkyl group having 1 to 5 carbon atoms, or a perfluoroalkoxy group having 1 to 5 carbon atoms, one or some of the fluorine atoms are optionally substituted by a halogen atom other than a fluorine atom, one or some of fluorine atoms in the perfluoroalkyl group are optionally substituted by a halogen atom other than a fluorine atom, one or some of fluorine atoms in the perfluoroalkoxy group are optionally substituted by a halogen atom other than a fluorine atom, s and t are each independently 0 to 5, and s+t represents an integer of 1 to 6 (when Z is —OC($R^{19}R^{20}$)O—, s+t is optionally 0), wherein the fluorine-containing copolymer includes structural unit (D), and a content of structural unit (D) is 30 to 67 mol % relative to a total content of all structural units in the fluorine-containing copolymer.

2. The fluorine-containing copolymer according to claim 1, wherein the fluorine-containing copolymer includes structural unit (B), and a content of structural unit (B) is 5 to 10 mol % relative to a total content of all structural units in the fluorine-containing copolymer.

3. The fluorine-containing copolymer according to claim 1, wherein the fluorine-containing copolymer includes structural unit (C), and a content of structural unit (C) is 5 to 10 mol % relative to a total content of all structural units in the fluorine-containing copolymer.

4. The fluorine-containing copolymer according to claim 1, wherein structural unit (A) includes a structural unit represented by the following formula (5):

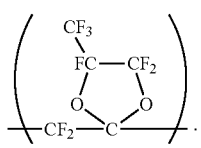

(5)

5. The fluorine-containing copolymer according to claim 1, wherein structural unit (D) includes a structural unit represented by the following formula (6):

where $R^{141}$, $R^{142}$, $R^{151}$, and $R^{152}$ each independently represent a fluorine atom, a perfluoroalkyl group having 1 to 5 carbon atoms, or a perfluoroalkoxy group having 1 to 5 carbon atoms, one or some of the fluorine atoms are optionally substituted by a halogen atom other than a fluorine atom, one or some of fluorine atoms in the perfluoroalkyl group are optionally substituted by a halogen atom other than a fluorine atom, and one or some of fluorine atoms in the perfluoroalkoxy group are optionally substituted by a halogen atom other than a fluorine atom.

6. The fluorine-containing copolymer according to claim 5, wherein structural unit (D) includes a structural unit represented by the following formula (7):

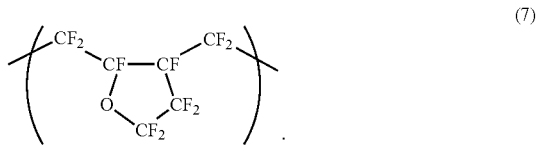

(7)

7. The fluorine-containing copolymer according to claim 5, wherein structural unit (D) includes a structural unit represented by the following formula (8):

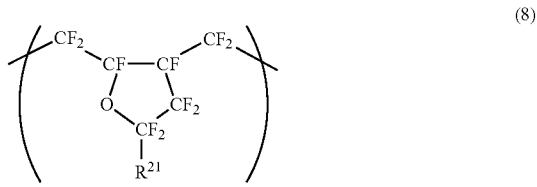

(8)

where $R^{21}$ represents a perfluoroalkyl group having 1 to 4 carbon atoms.

8. An optical resin composition comprising the fluorine-containing copolymer according to claim 1.

9. The optical resin composition according to claim 8, further comprising a refractive index modifier.

10. An optical resin formed body comprising the optical resin composition according to claim 8.

11. The optical resin formed body according to claim 10, wherein the optical resin formed body is an optical transmitting body.

12. The optical resin formed body according to claim 11, wherein the optical transmitting body is a plastic optical fiber.

* * * * *